July 8, 1952 R. E. KELLER 2,602,353
POWER TRANSMISSION MECHANISM
Filed June 7, 1948 2 SHEETS—SHEET 1
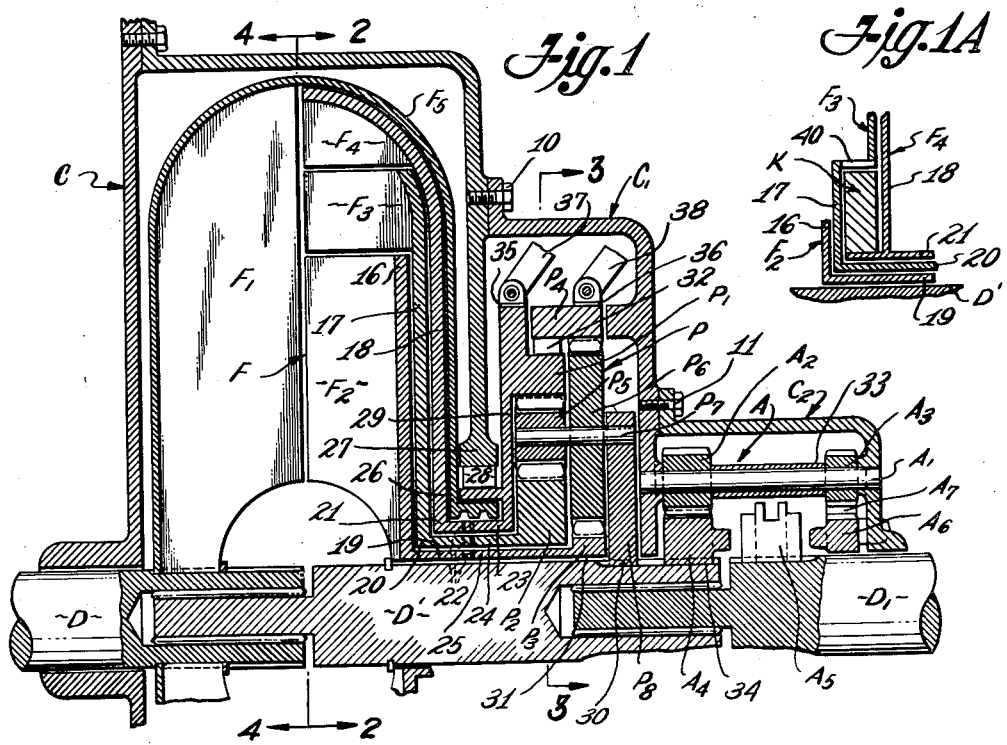
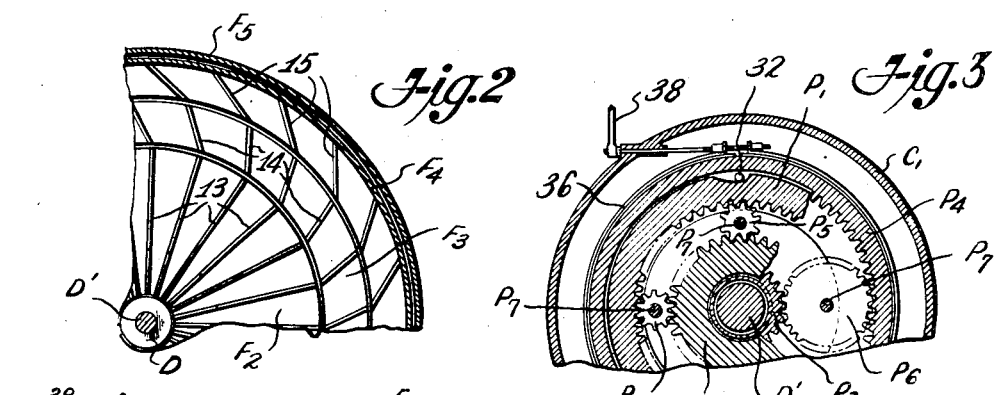
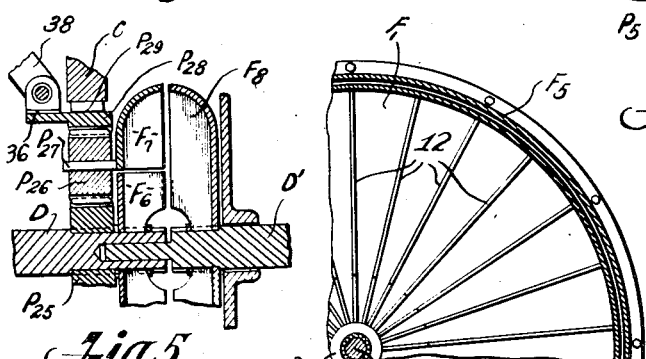
INVENTOR.
REX E. KELLER
BY Sutherd Thack
Attorney

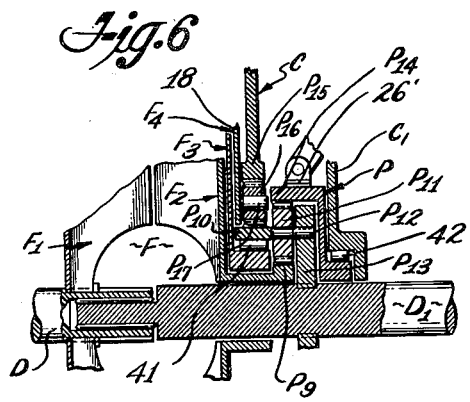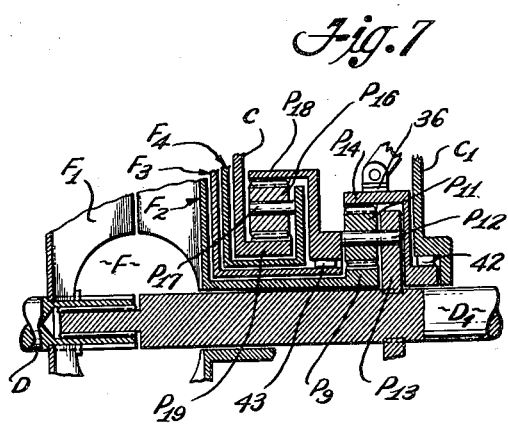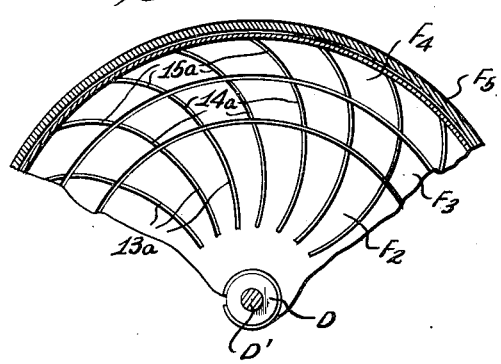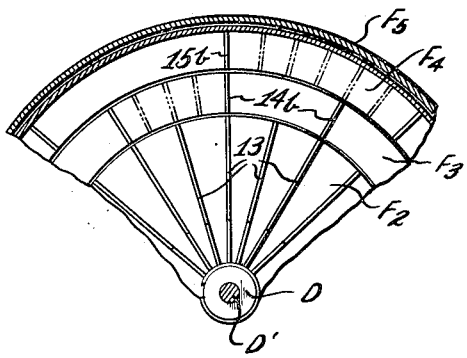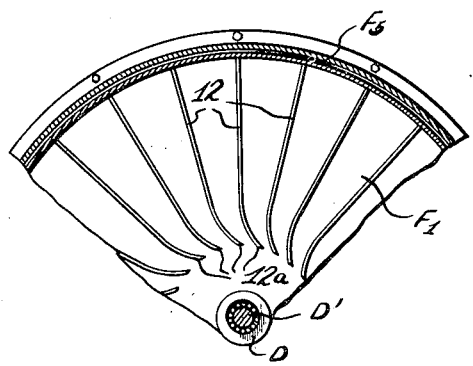
INVENTOR.
REX E. KELLER
BY Luther L. Mack
Attorney Patented July 8, 1952

2,602,353

UNITED STATES PATENT OFFICE 2,602,353

POWER TRANSMISSION MECHANISM

Rex E. Keller, Beverly Hills, Calif.

Application June 7, 1948, Serial No. 31,534

7 Claims. (Cl. 74—677)

This invention relates to power transmission mechanisms particularly adapted to automotive use, and more particularly to and has for a main object the provision of a four-stage completely automatically operative mechanism for obtaining neutral, low, intermediate, and direct forward driving ratios or by modification for providing neutral, low, direct, and overdriving ratios, optionally.

The power transmission mechanism of my invention includes a fluid coupling unit provided with three concentric runners operated by a single impeller instead of a single runner of a conventional type or optionally a multiple element impeller and a single runner; also two planetary gear units operatively connected with the runners for selectively driving a driven shaft at different speeds; and means for affording neutral and reverse stages, as well.

A further important object of my invention is to provide automatically for use of the compression of the engine for braking when required.

Other and more detailed objects of my present invention will appear as the description of the structure and operation of the mechanism progresses.

I have shown a preferred form of mechanism and modifications of portions thereof in the accompanying drawings, in which:

Fig. 1 is a partial longitudinal section of a complete unit in a preferred form in a vertical plane through the axis of the driving shaft;

Fig. 1a is a fragmentary section of the runner assembly showing a speed responsive type clutch arranged between two of the concentric runners;

Fig. 2 is a fragmentary view of the runners as seen in a transverse plane indicated by arrows 2—2 of Fig. 1;

Fig. 3 is a transverse section on line 3—3 of Fig. 1;

Fig. 4 is a transverse fragmentary section of the impeller in the plane of Fig. 2, but as seen in the direction of arrows 4—4 of Fig. 1;

Fig. 5 is a reduced cross sectional view in the direction of arrows 4—4 of Fig. 1, showing a multiple element impeller associated with a single runner of the fluid coupling unit;

Fig. 6 is a partial view of the mechanism of Fig. 1, with modifications designated to provide an overdriving stage in top ratio;

Fig. 7 is a partial view of the mechanism of Fig. 1, showing another modification providing overdrive and showing the sun gears instead of the orbit gears of the planetary sets connected to the case;

Figs. 8 and 10 are fragmentary views of the runners having different arrangements and forms of vanes; and Fig. 9 is a fragmentary view of the impeller showing a novel vane structure.

In Fig. 1, I have shown a completely assembled comprehensive and flexible unit including a case C arranged to house a fluid coupling unit F, a separable case $C_1$ attached to case C by bolts 10, for inclosing a dual planetary gear system P, and a second separable case $C_2$ secured by bolts 11 to case $C_1$, for enclosing an auxiliary sliding gear set A. All of the hereinabove mentioned mechanism is operatively mounted on and for drivingly connecting a driving shaft D, an intermediate shaft D' and a driven shaft $D_1$ all of said shafts being coaxial and adjacent shafts partly telescoped, as shown for purpose of coaxial alinement but not directly connected except as hereinafter described.

Fluid coupling unit F includes an impeller $F_1$ and coaxial low gear runner $F_2$, intermediate gear runner $F_3$, and high gear runner $F_4$ mounted in a case $F_5$ for synchronous and differential rotation under the influence of impeller $F_1$. Said impeller has straight radial vanes 12 as in Fig. 4, or formed with arcuate inner portions $12a$ as shown in Fig. 9. Runners $F_2$, $F_3$, and $F_4$ may have vanes 13, 14, and 15, respectively, as shown in Fig. 2 which may be curved as shown at $13a$, $14a$, and $15a$ in Fig. 8, or the vanes of runners $F_3$ and $F_4$ may be radial and unequal in number to vanes 13 of runner $F_2$, as at $14b$ and $15b$, as shown in Fig. 10.

Webs 16, 17, and 18 of runners $F_2$, $F_3$, and $F_4$, respectively, have hubs 19, 20, and 21 which are nested one within the other on shaft D' and are laterally connected as by means of interlocking splines or teeth 22 with hub 23, 24, and 25, respectively, of an orbit gear $P_1$ and sun gears $P_2$ and $P_3$ of the planetary unit P. The runner $F_4$ and orbit gear $P_1$ are free-wheelingly connected at its hub 21 with a hub 27 of case C through rollers 28 mounted between the web 18 of outer runner $F_4$ and the web 29 of orbit gear $P_1$.

Sun gear $P_2$ is drivingly connected with orbit gear $P_1$ by planet pinions $P_5$ and sun gear $P_3$ is drivingly connected with a second orbit gear $P_4$ by means of planet pinions $P_6$ which are coaxial with pinions $P_5$ and are carried on shafts $P_7$ extended from a common carrier $P_8$ which is fixed at 30 to shaft D'. Thus, the planetary gear set is compounded so that the orbit gears $P_1$ and $P_4$ are differentially connected with their sun gears. It will be noted that sun gear $P_3$ is rotatable on shaft D' and connected to runner $F_2$ while sun gear $P_2$ is connected to intermediate runner $F_3$, and orbit gears $P_1$ and $P_4$ are free-wheelingly connected at 32 so that one of said elements may at times overrun or underrun the other.

The auxiliary gear set A includes a countershaft $A_1$ bearing gears $A_2$ and $A_3$ spaced apart as by a sleeve 33. A driving gear $A_4$ is fixed at 34 to shaft D'.

A shift collar $A_5$ is clutched to driven shaft $D_1$ and a gear $A_6$ is loosely carried by shaft $D_1$ and permanently connected with gear $A_3$ by an idler gear $A_7$ (not otherwise shown except in Fig. 1) to provide a reverse driving connection for shaft D'. Forward rotation of shaft $D_1$ is effected by shifting collar $A_5$ into engagement with a gear $A_4$ and reverse rotation by connecting collar $A_5$ with gear $A_6$, through elements $A_4$, $A_2$, $A_1$, $A_3$, $A_7$, $A_8$, and $A_5$, in order. It will be noted that with the shift collar $A_5$ in neutral position, no drive can be transmitted to the driven shaft.

Orbit gears $P_1$ and $P_4$ have brake bands 35 and 36 applied thereto which are adapted to be operated by arms 37 and 38, respectively, arranged for connection with a manual control or with the foot pedal or accelerator pedal of a vehicle for at times retarding rotation of the orbit gears.

As shown in Fig. 1a, a speed responsive type automatic clutch K may be employed between the intermediate and outer runners $F_3$ and $F_4$ at a location near shaft D' for the purpose of at times locking said pair of runners together to maintain synchronous rotation thereof. In such case the walls of the runners are so formed as to provide a recess for clutch K, rotation of runner $F_4$ serving to project the clutch locking members outwardly by centrifugal force into locking engagement with a portion 40 of runner $F_3$ as said runners attain synchronism.

The modified forms of mechanisms shown in Figs. 6 and 7 are designed to provide overdriving ratios and omit the intermediate coaxial shaft D' and telescopically arrange the driving shaft D and driven shaft $D_1$ while other elements are otherwise somewhat differently arranged than as shown in Fig. 1.

In Fig. 6, the inner runner $F_2$ is fixed to or integral with sun gear $P_9$, runner $F_3$ is free-wheelingly connected at 41 with a second sun gear $P_{10}$ which is fixed by pin $P_{12}$ to a carrier $P_{13}$, pinions $P_{11}$ are carried on shafts $P_{12}$, projecting from carrier $P_{13}$ and connect orbit gear $P_{14}$ with sun gear $P_9$. Sun gear $P_{10}$ drives pinions $P_{16}$ which mesh with a stationary orbit gear $P_{15}$ on case C and are carried on shafts $P_{17}$ supported on the web 18 of runner $F_4$. Orbit gear $P_{14}$ free-wheels at 42 on case $C_1$, and the drive to shaft $D_1$ is through carrier $P_{13}$ which is permanently affixed thereto. The drive is initially through runner $F_2$ and thence sun gear $P_9$, pinions $P_{11}$ and carrier $P_{13}$ to shaft $D_1$, orbit gear $P_{14}$ being held against reverse rotation by free-wheeling clutch 42. Orbit gear $P_{14}$ can at times be retarded by a brake band 26' connected optionally with the foot actuated brake of an automobile, so that when the orbit gear is restrained or retarded by initial movement of the pedal the pinions will roll on the orbit gear and rotate the carrier thereby applying torque at a reduced ratio to shaft $D_1$ because of the resistance due to the compression of the engine, thus affording a braking means.

Runner $F_4$ carries the pinions $P_{16}$ with it, and as the speed of runner $F_3$ increases it free-wheelingly drives sun gear $P_{10}$ and pinions $P_{16}$ in turn so that said pinions roll on stationary orbit gear $P_{15}$. Hence the energy applied to runners $F_3$ and $F_4$ being deflected against the vanes of the inner runner $F_2$ is added to the torque effort directed against runner $F_2$ and is reflected or transmitted to the driven shaft $D_1$ through sun gear $P_9$, pinion $P_{11}$, and carrier $P_{13}$.

In this connection reference is made to Figs. 2, 8, and 10 wherein the disposition of the runner vanes is such as to direct a maximum amount of energy applied successively to runner $F_4$ and $F_3$, from runner $F_4$ to runner $F_3$, and thence against the vanes of runner $F_2$. Also, the impeller vanes shown in Fig. 9 are of such form and so disposed as to scoop the fluid from the inner portion of the fluid coupling and violently thrust it outwardly with varying effect upon the vanes of the three runners.

In Fig. 7, the arrangement differs from that of Fig. 6, primarily in that orbit gear $P_{18}$ (in lieu of $P_{15}$ in Fig. 6) is associated with the intermediate runner $F_3$ instead of case C and is free-wheelingly connected at 43 with runner $F_3$, the sun gear $P_{19}$ (in lieu of $P_{10}$ in Fig. 6), being fixed to case C instead of the orbit gear as in Fig. 6. Thus, orbit gear $P_{18}$ is rotated by runner $F_4$ through pinions $P_{16}$ and carrier shafts $P_{17}$ around the stationary sun gear $P_{19}$ or by runner $F_3$ through free-wheeling clutch 43 while the total torque of all of the runners is transmitted to shaft $D_1$ through sun gear $P_9$, pinions $P_{11}$, and carrier $P_{13}$.

Reverting now to the consideration of the mechanism of Fig. 1, it may be noted that with the motor idling in neutral the slippage of the fluid coupling is complete and the vehicle will stand still without operating a foot clutch. To proceed forwardly the operator applies pressure to the accelerator and the vehicle will start forwardly in a positive low gear set-up and with minimum clutch slipping action. Fluid is thrown by the impeller into forcible impingement with the vanes of the runners but only inner runner $F_2$ has sufficient leverage to drive the driven shaft $D_1$ and so is the only one that is rotated, the vanes of runners $F_3$ and $F_4$ serving as guide vanes as in a torque converter.

Runner $F_2$ drives the vehicle initially in low gear through the larger planetary gear set including elements $P_3$, $P_6$, $P_7$, and $P_8$, necessary leverage for low gear ratio being obtained against case C through the orbit gears $P_1$ and $P_2$ and the overrunning clutches 32 and 28 which prevent rotation of those gears due to reaction, the carrier $P_8$ being fixed to driven shaft $D_1$.

A second gear connection is automatically and smoothly established when the relative torque between the rear wheels and the motor of the vehicle decreases and the motor speed increases, thereby rendering runner $F_3$ effective for driving the vehicle through the smaller planetary gear set, $P_2$—$P_5$—$P_1$—$P_7$—$P_8$, which likewise has leverage against the case through its orbit gear $P_1$ and free-wheeling clutch 28 between it and the case. It is to be noted that the same carrier $P_8$ serves for both planetary units and that the temporary differential between the two planetary units is accommodated by free-wheeling clutch 32.

Direct driving is obtained when high speed conditions prevail, thereby permitting runner $F_4$ to also rotate forwardly, when all of the runners $F_2$, $F_3$ and $F_4$ rotate together in unison as a single runner, both orbit gears $P_1$ and $P_4$ being locked against reverse rotation and all planetary gear action ceases, the result being the same as though a single (undivided) runner were directly coupled to the driven shaft $D_1$, and with rarely any relative gear action between the elements of the dual planetary gear sets.

The laws of centrifugal force as applied to fluids enables the employment of the same power to be transmitted by a progressively smaller runner area as the radius increases and by still smaller runner areas as the speed increases, and in my designs forming the subject matter of this application I designed and proportioned the runners of the fluid coupling unit so as to provide a maximum effect at the point of power take-off. In the designs mentioned I have utilized the advantageous combination of both the torque conversion principle and the straight fluid clutch action, as a foundation of my completely automatic mechanism.

An added advantage of my transmission is the ease with which lower gear ratio motor compression may be incorporated in this otherwise completely automatic operation without any gear shifting whatever. By connecting the brakes on the planetary drums directly or through booster action to the vehicle wheel foot operated brake pedal or otherwise, engine compression can at any time be automatically applied by merely applying pressure from the brake pedal or otherwise, to lock the drums against rotation and thereby conserving the brakes as when descending grades and under other conditions, or a quick return to second gear can be effected through control from the accelerator pedal after the drums are released.

When it becomes necessary for a vehicle operator to retard the progress of the vehicle for any reason my transmission is always in readiness to respond to requirements of speed and torque, without deliberation or thought on the part of an operator, effort or loss of time to proceed forwardly in the most advantageous gear ratio required under normal or exaggerated conditions, and when set in completely automatic position, meets all regular and emergency demands of driving.

It may be understood that while I have shown and described herein a mechanism for providing a limited number of operating stages the same principle may be employed in more comprehensive units adapted to provide any desired number of stages as may be desirable for use on trucks and other heavy duty vehicles. Also the elements of the instant mechanism lend themselves to different combinations, interconnections, and arrangements for meeting varying requirements of use.

It will be noted that as shown in Fig. 5, the fluid coupling unit may include a multiple element impeller with an inner element $F_6$ and a concentric outer element $F_7$, and a single runner $F_8$, element $F_6$ being fixed to driving shaft D and runner $F_8$ to driven shaft D'.

Connection of outer impeller element $F_7$ with shaft D is effected through a single planetary gear set including a sun gear $P_{25}$ fixed to shaft D, planetary pinions $P_{26}$ carried on pins $P_{27}$ extended from outer impeller $F_7$, and an orbit gear $P_{28}$ free-wheelingly mounted at $P_{29}$ on case C.

A brake band 36 operated by a member 38 (as in Fig. 3) is applied to orbit gear $P_{28}$ and through said planetary gear set. The brake and said impeller elements power is variably applied to runner $F_8$ having its vanes formed and disposed as in Figs. 8, 9, and 10, or otherwise for obtaining best results.

I claim:

1. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, and a carrier drivingly connecting said sun and orbit gears through pinions carried thereby to said driven shaft, whereby torque applied to said runners is variably applied to and serves to drive the driven shaft at speeds corresponding to the variable torque.

2. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, and a carrier drivingly connecting said sun and orbit gears through pinions carried thereby to said driven shaft, whereby torque applied to said runners is variably applied to and serves to drive the driven shaft at speeds corresponding to the variable torque, said runners having gradually decreasing effective areas as their radius increases.

3. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, a carrier drivingly connecting said sun and orbit gears through pinions carried thereby to said driven shaft, whereby torque applied to said runners is variably applied to and serves to drive the driven shaft at speeds corresponding to the variable torque, said runners having gradually decreasing effective areas as their radius increases, and vanes disposed thereon in such a manner as to deflect fluid inwardly from the outermost to the innermost runner so as to at times maximize the torque applied to the inner runners.

4. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, a carrier drivingly connecting said sun and orbit gears through pinions carried thereby to said driven shaft, whereby torque applied to said runners is variably applied to and serves to drive the driven shaft at speeds corresponding to the variable torque, and braking means applicable to said orbit gears for at times retarding rotation of the orbit gears.

5. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, and a carrier drivingly connecting said sun and orbit gears through pinions carried thereby to said driven shaft, whereby torque applied to said runners is variably applied to and serves to drive the driven shaft at speeds corresponding to the variable torque, a case enclosing said fluid coupling, one of said runners being free-wheelingly connected with said case, so as to permit free forward rotation of said runner on said case but prevent reverse rotation thereof.

6. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, and a carrier drivingly connecting said sun and orbit gears through pinions carried thereby to said driven shaft, whereby torque applied to said runners is variably applied to and serves to drive the driven shaft at speeds corresponding to the variable torque, the ratio between the first set of sun and orbit gears and that between the second sun and orbit gears being different, for correspondingly varying the range of torque applications to the driven shaft.

7. A power transmission mechanism comprising: driving and driven shafts, a fluid coupling unit having an impeller drivingly connected with the driving shaft and a plurality of concentric runners adapted to apply power to the driven shaft, a planetary gear set including a first orbit gear drivingly connected with a first of said runners, a first sun gear connected with a second runner, a second sun gear connected with a third runner, a second orbit gear free-wheelingly connected with said first orbit gear, a carrier drivingly connecting said sun and orbit gears through pinions carried thereby to said driven shaft, whereby torque applied to said runners is variably applied to and serves to drive the driven shaft at speeds corresponding to the variable torque, and an automatic clutch operatively connected between two adjacent runners of the fluid coupling to effect and maintain a positive lock-up of the thus connected runners at points above predetermined speed.

REX E. KELLER.

REFERENCES CITED

The following references are of record in the file of this patent:

UNITED STATES PATENTS

| Number | Name | Date |
| --- | --- | --- |
| 2,158,557 | Lammeren | May 16, 1939 |
| 2,162,803 | England | June 20, 1939 |
| 2,203,177 | Patterson | June 4, 1940 |
| 2,284,123 | Breer et al. | May 26, 1942 |
| 2,312,849 | Pollard | Mar. 2, 1943 |
| 2,316,390 | Biermann | Apr. 13, 1943 |
| 2,318,660 | Barrett | May 11, 1943 |
| 2,360,258 | Murray | Oct. 10, 1944 |
| 2,383,980 | Lysholm | Sept. 4, 1945 |
| 2,388,062 | Keller | Oct. 30, 1945 |
| 2,408,008 | Tipton | Sept. 24, 1946 |